L. SCHWITZER.
OILING SYSTEM.
APPLICATION FILED APR. 17, 1911.

1,055,668.

Patented Mar. 11, 1913.

2 SHEETS—SHEET 1.

Witnesses
Frank A. Fahle
May Layden

Inventor
Louis Schwitzer,
By Bradford Hood
Attorneys

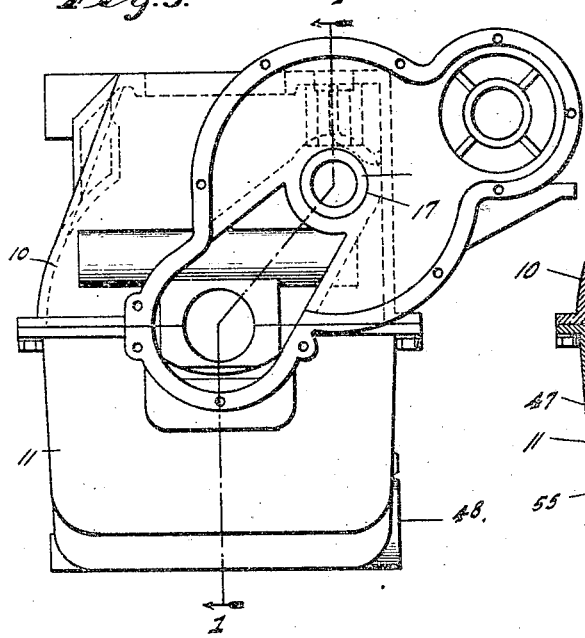
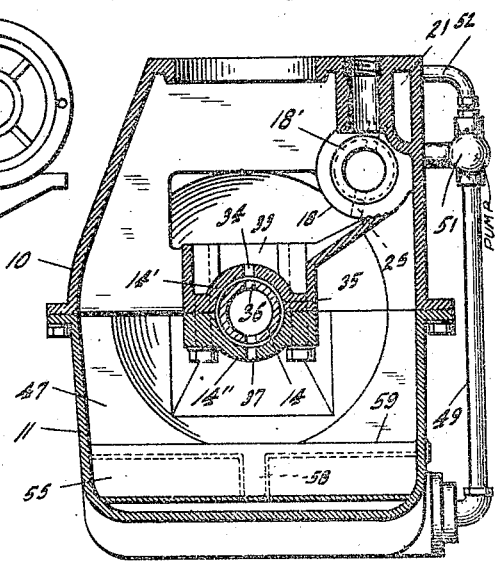
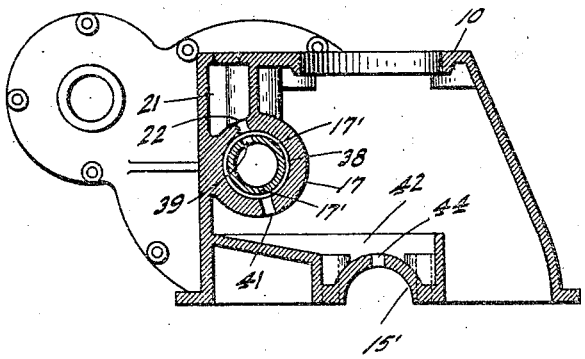
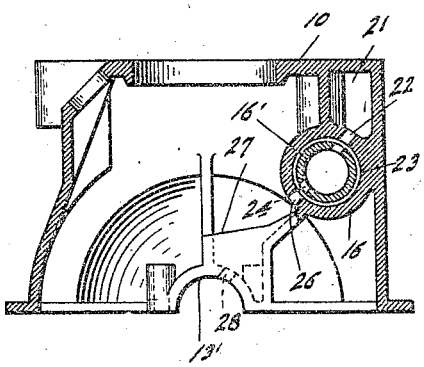

UNITED STATES PATENT OFFICE.

LOUIS SCHWITZER, OF INDIANAPOLIS, INDIANA, ASSIGNOR, BY MESNE ASSIGNMENTS, TO LYONS ATLAS COMPANY, OF INDIANAPOLIS, INDIANA, A CORPORATION OF INDIANA.

OILING SYSTEM.

1,055,668.     Specification of Letters Patent.     Patented Mar. 11, 1913.

Application filed April 17, 1911. Serial No. 621,653.

*To all whom it may concern:*

Be it known that I, LOUIS SCHWITZER, a citizen of the United States, residing at Indianapolis, in the county of Marion and State of Indiana, have invented a new and useful Oiling System, of which the following is a specification.

The object of my invention is to produce a base casing structure for internal combustion engines of such character that all of the bearings will be supplied with an adequate quantity of lubricating oil.

The accompanying drawings illustrate my invention.

Figure 1:
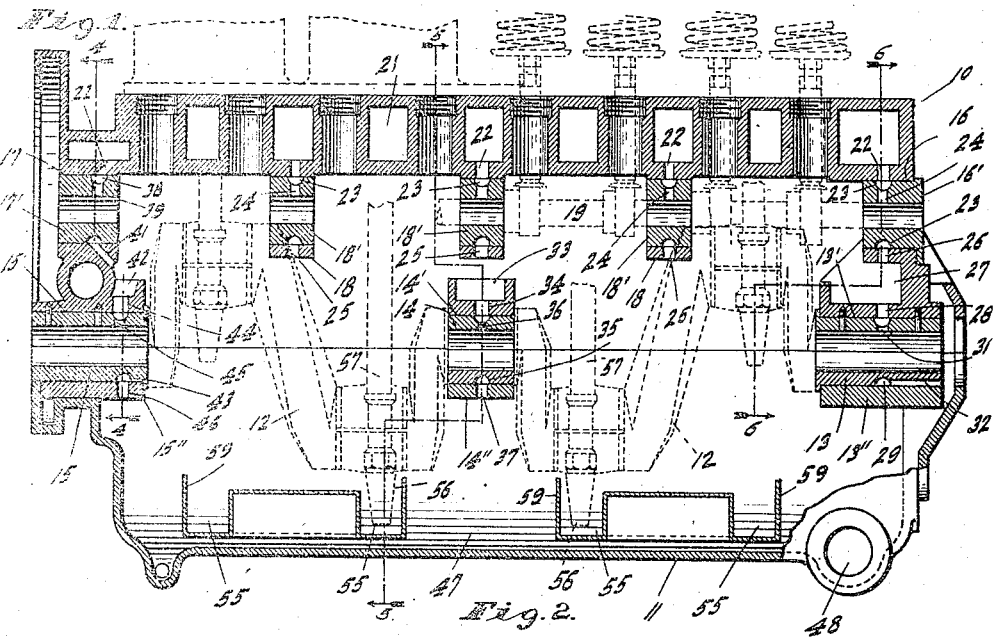
Figure 2:
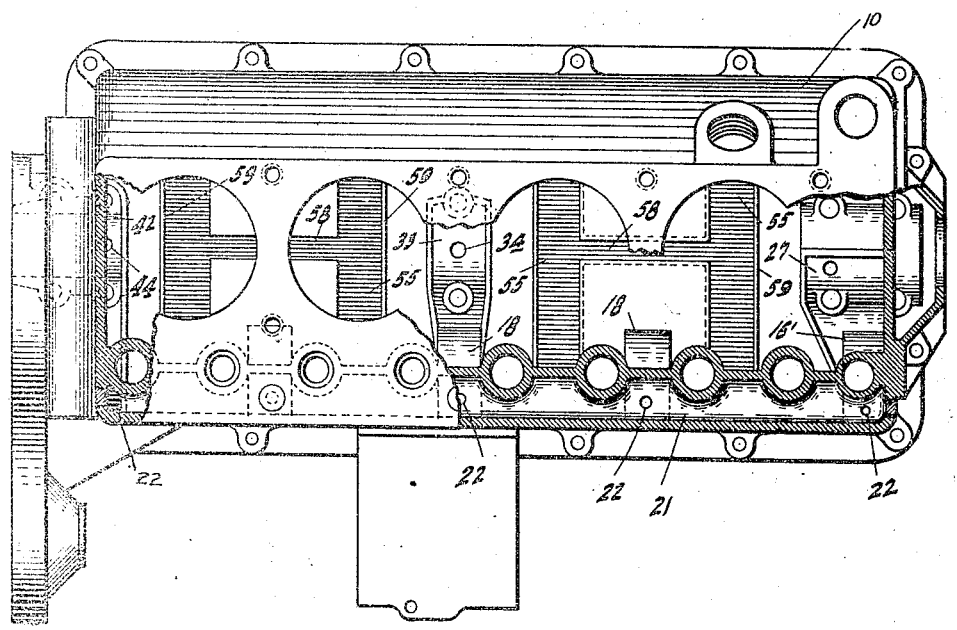

Figure 1 is a vertical section on line 1—1 of Fig. 3; Fig. 2 a plan in partial horizontal section; Fig. 3 an end elevation; Fig. 4 a section on line 4—4 of Fig. 1 of the upper casing member; Fig. 5 a section on line 5—5 of Fig. 1; and Fig. 6 a section of the upper casing member on line 6—6 of Fig. 1.

In the drawings, 10 and 11 indicate, respectively, upper and lower hollow casing members which mate upon a plane which extends through the bearings for the crank shaft 12, shown in dotted lines in Fig. 1. The crank shaft bearings are formed in bushings 13, 14 and 15, each of which is preferably a continuous or circular bushing, and in order to receive these bushings, the upper casing member is provided with semi-cylindrical bushing pockets 13′, 14′ and 15′, respectively, which are formed in portions preferably integral with the casing member. Detachably secured to the members 13′, 14′ and 15′, respectively, are cap members 13″, 14″, and 15″ of ordinary form. Formed through the end walls of the member 10 are alined bushing pockets 16 and 17 in which are mounted bushings 16′ and 17′, respectively. Formed in integral portions of member 10 in alinement with the bushing pockets 16 and 17 are intermediate bushing pockets 18 in each of which is mounted a bushing 18′, which are in alinement with the bushings 16′ and 17′ and formed to receive and support a cam shaft 19 indicated in dotted lines in Fig. 1.

Formed within casing 10 above the bushing pockets 16, 17 and 18, is a closed oil chamber 21 which extends the entire length of the casing and is provided with a plurality of outlets 22 each of which leads to a bushing pocket 16, 17 or 18. Opposite each outlet 22 the corresponding bushing 16′, 17′ and 18′ is provided with a circumferential groove 23 and, at its top, each of these bushings is provided with an oil passage 24 which leads from the bottom of the groove 23 to the bore of the bushing. Leading through the bottom of each bushing pocket 18 is a passage 25. Leading through the lower side of the bushing pocket 16 is an oil passage 26 which delivers into a basin 27 which is formed above the bushing pocket 13′ and communicates therewith through an oil passage 28. The bushing 13 is provided with a circumferential exterior groove 29 from which an oil passage 31 leads to the interior of the bushing. The bushing 13 is also provided along its bottom with a longitudinal groove 32 which leads from the lower part of the groove 29 to the end of cap 13″. The middle bushing pocket 18 lies above the bushing pocket 14′ and delivers oil through its passage 25 to an oil basin 33 which is formed in the upper surface of the bushing pocket 14′ and communicates with said pocket through a passage 34. The bushing 14 is provided with a circumferential groove 35 which registers with passage 34 and is provided with a passage 36 which leads from groove 35 to the interior of the bushing. The bushing cap 14″ is provided with a passage 37 which permits surplus oil to flow downwardly into the casing member 11. Bushing 17′ is also provided with a circumferential external groove 38 from which a passage 39 leads to the top of the bore of the bushing. A passage 41 formed through the bottom of the bushing pocket 17 registers at its upper end with groove 38 and at its lower end delivers into an oil pocket 42 which is formed above the upper part of the bushing pocket 15′. Bushing 15 is provided with a circumferential external groove 43 which registers with a passage 44 leading from pocket 42 and also is provided with a passage 45 which leads from the groove 43 into the interior of the bushing. A small passage 46 formed through a cap 15″ permits the surplus oil to flow into the casing 11.

Casing 11 is formed so as to produce a main or general oil reservoir 47 from which an oil outlet 48 delivers to a pipe 49 which is the suction pipe of an oil pump 51 which delivers through pipe 52 to oil chamber 21. Extending across the interior of the bottom of member 11, opposite each crank of the crank shaft, is a comparatively narrow oil trough 55 into each of which may dip a splash finger 56 carried by a pitman 57 mounted on the crank shaft. The troughs 55 are connected in pairs by an intermediate passage 58 and the end walls 59 of the troughs are somewhat higher than the inner walls. Arranged above each pair of troughs 55 is one of the intermediate bushing pockets 18, the arrangement being such that oil flowing through the passages 25 will drop into the trough structure.

In operation a sufficient quantity of oil will be placed in member 11 to give a normal level of oil slightly below the upper edges of the walls 59 and the pump 51 is of such character as to deliver oil to chamber 21 in such quantities as to keep such chamber full and the oil under pressure therein. Consequently the oil will be delivered at a considerable velocity from chamber 21 through the various openings 22 and from thence to the circumferential grooves of the bushings 16', 17' 18'. From these circumferential grooves a sufficient quantity of oil for the bearings of the cam shaft will flow into the interior of the bushings while the remainder of the oil will flow around through the circumferential grooves and be delivered through the proper passages to the oil pockets 27, 33 and 42 and from the intermediate bushing pockets 18 to the troughs 57. By this arrangement, a continuous circulation of oil is maintained, each bearing receiving a positive and uniform supply of oil.

I claim as my invention:

1. A crank base for engines comprising upper and lower hollow mating members, the upper member having an oil chamber in its upper part, cam shaft bearings communicating with said oil chamber, one of said members having crank shaft bearings below the cam shaft bearings, oil basins formed above said crank shaft bearings and receiving oil from the oil chamber, splash troughs arranged in the lower casing member in position to receive a supply of oil from the oil chamber, and means for delivering oil from the lower casing member into the oil chamber of the upper casing member.

2. An engine crank base comprising a pair of hollow mating casing members, the upper member having a closed oil chamber, a plurality of shaft bearings arranged within the casing structure and each having oil passages receiving oil from the oil chamber, crank shaft bearings arranged in one of the casing members below the first mentioned shaft bearings, and oil basins formed adjacent said crank shaft bearings to deliver thereto and to receive oil by gravity from the shaft bearings above, and means for delivering oil from the lower casing member into the oil chamber and maintaining such delivered oil under pressure in said oil chamber.

3. An engine base comprising upper and lower hollow casing members, the upper casing member having an oil chamber formed in its upper part, and carrying a plurality of bushing pockets communicating with the oil chamber, a bushing mounted in each of said pockets and having an exterior circumferential groove and a passage leading from such groove to the top of its bore, crank shaft bearings arranged within the casing and each surmounted by an oil basin delivering thereto and arranged to receive the overflow from one of the bushing pockets, splash troughs arranged within the lower casing member below the crank shaft bearings and in position to receive overflow from some of the said bushing pockets, and means for delivering oil from the lower casing member to the oil chamber of the upper casing member.

4. An engine base comprising upper and lower hollow casing members, the upper casing member having an oil chamber formed in its upper part, and carrying a plurality of bushing pockets communicating with the oil chamber, a bushing mounted in each of said pockets and having an exterior circumferential groove and a passage leading from such groove to the top of its bore, splash troughs arranged within the lower casing member below the crank shaft bearings and in position to receive overflow from some of said bushing pockets, and means for delivering oil from the lower casing member to the oil chamber of the upper casing member.

5. An engine base comprising upper and lower hollow casing members, the upper casing member having an oil chamber formed in its upper part, and carrying a plurality of bushing pockets communicating with the oil chamber, a bushing mounted in each of said pockets and having an exterior circumferential groove and a passage leading from such groove to the top of its bore, crank shaft bearings arranged within the casing and each surmounted by an oil basin delivering thereto and arranged to receive the overflow from one of the bushing pockets, and means for delivering oil from the lower casing member to the oil chamber of the upper casing member.

6. An engine base comprising upper and lower hollow casing members, the upper casing member having an oil chamber formed in its upper part, and carrying a plurality of bushing pockets communicating with the oil chamber, a bushing mounted in each of said pockets and having an exterior circumferential groove and a passage leading from such groove to the top of its bore, said bushing pockets having passages leading to the grooves at the tops of the bushings and leading from the grooves at the bottoms of the bushings, and means for delivering oil from the lower casing member to the oil chamber of the upper casing member.

In witness whereof, I, have hereunto set my hand and seal at Indianapolis, Indiana, this 6th day of April, A. D. one thousand nine hundred and eleven.

LOUIS SCHWITZER. [L. S.]

Witnesses:
ARTHUR M. HOOD,
FRANK A. FAHLE.